United States Patent [19]
Janssen et al.

[11] Patent Number: 5,505,657
[45] Date of Patent: Apr. 9, 1996

[54] DEVICE FOR CONVEYING SLAUGHTERED ANIMALS, IN PARTICULAR BIRDS

[75] Inventors: Petrus C. H. Janssen, Wilbertoord; Cornelis J. Janssen, AB Holthees; Eric H. W. Peters, ME Boxmeer; Adrianus J. van den Nieuwelaar, XG Gemert, all of Netherlands

[73] Assignee: Stork PMT B.V., AV Boxmeer, Netherlands

[21] Appl. No.: 122,831

[22] Filed: Sep. 16, 1993

Related U.S. Application Data

[63] This is a Continuation-in-Part of PCT/NL93/00016, Jan. 15, 1993 now WO93/13,671, Jul. 22, 1993.

[51] Int. Cl.⁶ .............................................. A22C 21/00
[52] U.S. Cl. ........................ 452/179; 452/183; 452/188
[58] Field of Search ............................ 452/179, 183, 452/188, 178, 180

[56] References Cited

U.S. PATENT DOCUMENTS

| | | | |
|---|---|---|---|
| 2,423,560 | 7/1947 | Jasper | 452/188 |
| 2,438,608 | 3/1948 | Johnson | 17/44.1 |
| 2,557,707 | 6/1951 | Utter | 452/188 |
| 2,584,377 | 2/1952 | Wunderlich | 452/183 |
| 2,625,707 | 1/1953 | Liittjohann | 452/188 |
| 2,658,236 | 11/1953 | Altenpohl | 452/188 |
| 2,685,706 | 8/1954 | Zebarth | 452/188 |
| 2,739,347 | 3/1956 | Sharp et al. | 452/188 |
| 3,124,831 | 3/1964 | Altenpohl | 452/183 |
| 3,166,785 | 1/1965 | Lemmond | 452/183 |
| 3,376,600 | 4/1968 | Shadley | 452/183 |
| 3,518,717 | 7/1970 | Johnson et al. | 452/183 |
| 3,596,749 | 8/1971 | Altenpohl et al. | 452/188 |
| 4,213,229 | 7/1980 | Heimer et al. | 452/188 |
| 4,272,863 | 6/1981 | Parker, Jr. | 452/179 |
| 4,602,403 | 7/1986 | Martin | 452/177 |
| 4,756,056 | 7/1988 | Innes et al. | 452/179 |
| 4,780,930 | 11/1988 | Sparkin | 452/179 |
| 5,092,815 | 3/1992 | Polkinghorne | 452/179 |

FOREIGN PATENT DOCUMENTS

| | | |
|---|---|---|
| 0084918 | 1/1983 | European Pat. Off. . |
| 0086700 | 4/1988 | European Pat. Off. . |
| 0381093 | 8/1990 | European Pat. Off. . |
| 0444782 | 1/1991 | European Pat. Off. . |
| 1331011 | 6/1963 | France . |
| 8516336 | 10/1965 | France . |
| 2514733 | 10/1981 | France . |
| 3247327 | 12/1982 | Germany . |
| 7405634 | 4/1974 | Netherlands . |
| 8602922 | 11/1986 | Netherlands . |
| 1164813 | 9/1969 | United Kingdom . |

Primary Examiner—Willis Little
Attorney, Agent, or Firm—Deveau, Colton & Marquis

[57] ABSTRACT

Device for conveying slaughtered animals or a part thereof, having a number of leg carriers, each of which is connected by way of a rotatable connecting element to a trolley of a conveyor, and runs through a track past at least one processing station. Each leg carrier is disposed eccentrically relative to the vertical axis of rotation of the corresponding connecting element.

15 Claims, 6 Drawing Sheets

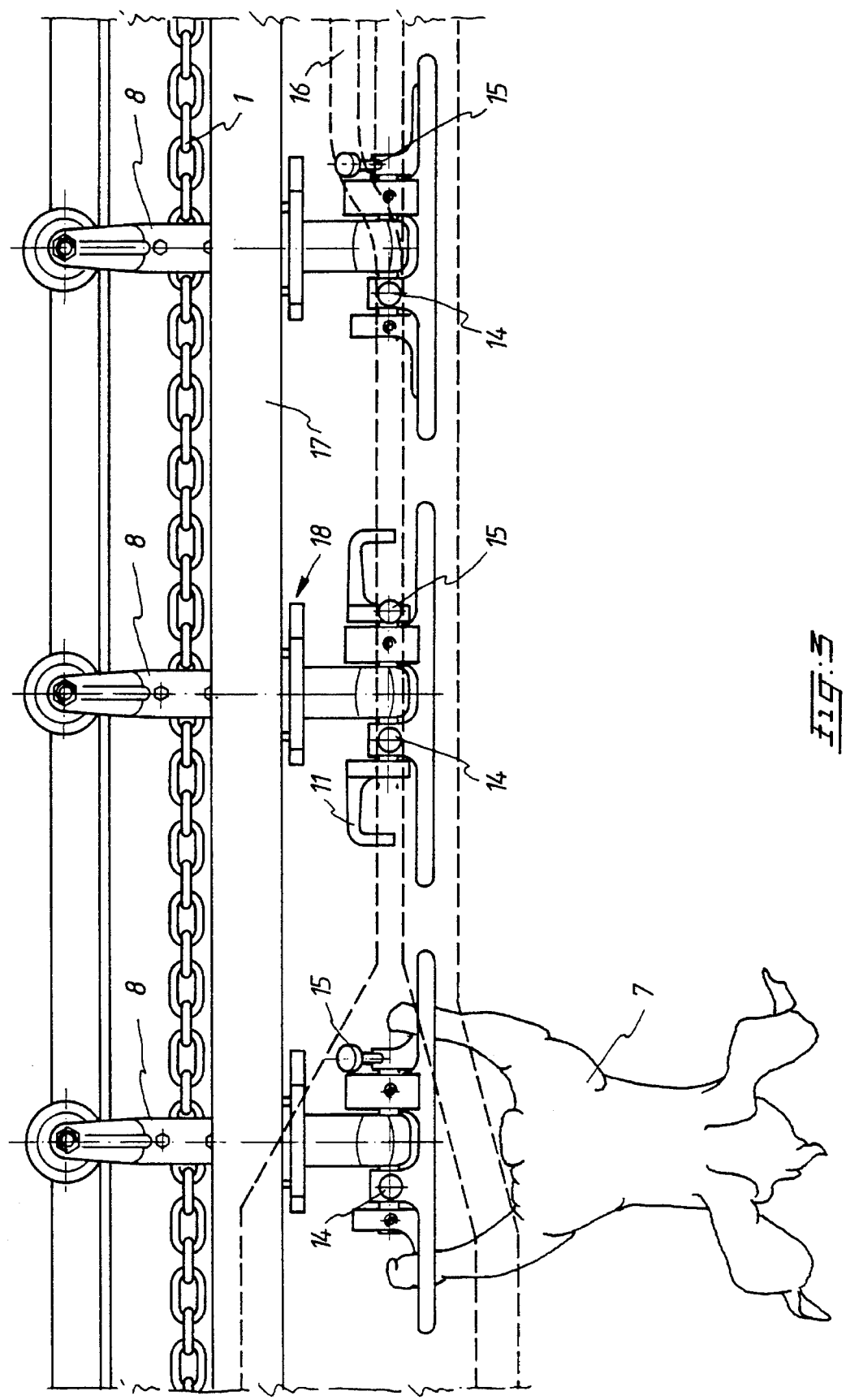

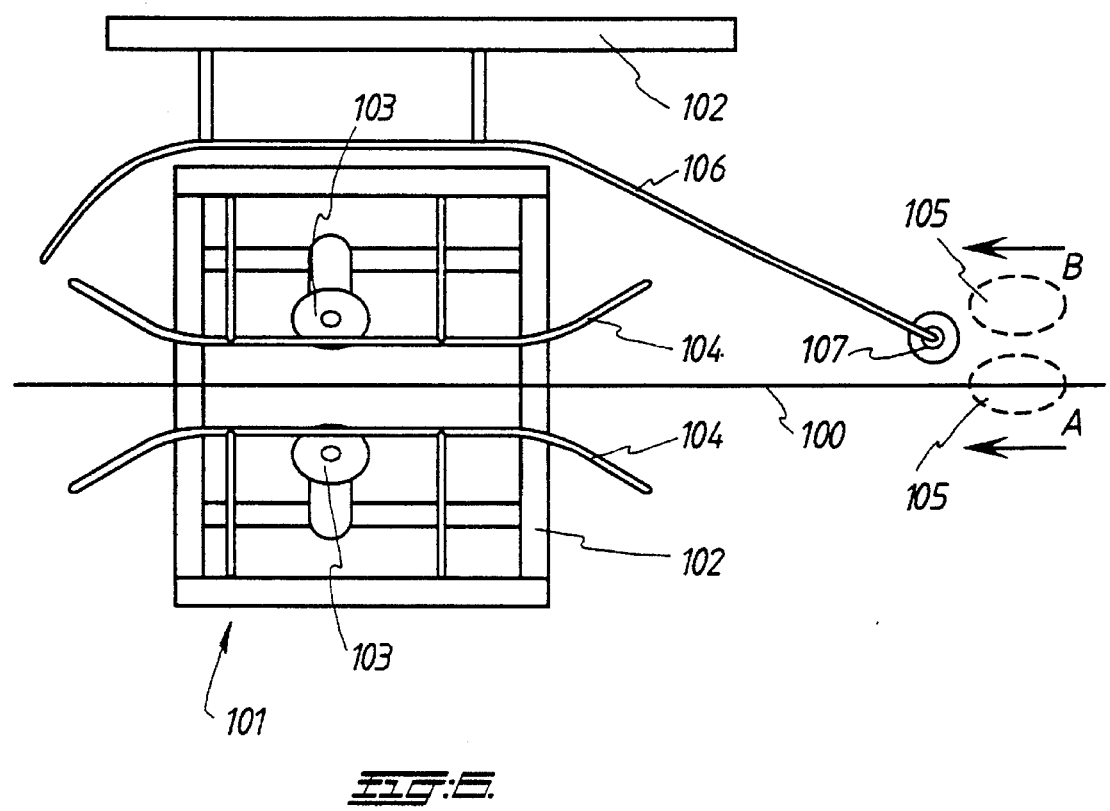

DEVICE FOR CONVEYING SLAUGHTERED ANIMALS, IN PARTICULAR BIRDS

This is a continuation-in-part International Application PCT/NL93/00016, filed on 15 Jan. 1993 and which designated the U.S., now WO.93/13,671, published Jul. 22, 1993.

BACKGROUND OF THE INVENTION

The invention relates to a device for conveying slaughtered animals, in particular birds, or a part thereof, hanging by at least one leg, the device comprising a plurality of leg carriers for the animals or parts thereof, which leg carriers are each connected by way of rotatable connecting means to a trolley of a conveyor running through a track past at least one processing station, the connecting means being rotatable about an essentially vertical axis through a predetermined angle relative to the trolley, the connecting means comprising means for fixing the angular orientation of the leg carrier relative to the trolley.

DISCUSSION OF THE PRIOR ART

A prior art device is known from European Patent Application Publ. No. 444,782.

In the known device it is not possible to disregard certain processing operations along the track of the conveyor. Nor is it possible, for example, to make a choice between two processing machines disposed on either side of the track.

A still further disadvantage of the known device is that it is designed to cause a fixed series of processing operations to be carried out on the slaughtered animal; it is not capable of causing the processing range to be adapted depending on certain characteristics of the slaughtered animal.

SUMMARY OF THE INVENTION

The object of the invention is to provide a device having the possibility of taking a slaughtered animal or part thereof into or out of the working range of a processing machine disposed along the conveyance track.

A further object of the invention is to provided a device for controlling the processing of a slaughtered animal being conveyed along a processing station.

According to the invention, the leg carriers are disposed eccentrically relative to the axis of rotation of the corresponding connecting means. Hereby a slaughtered animal may be taken into or out of the working range of a processing machine along the route by rotating the leg carrier. One may thus avoid using parallel transport tracks for processing animals in different ways. The processing equipment can be used more efficiently in one single transport track, processing each animal in a specific manner by selecting the equipment to be used and to be avoided.

According to a preferred embodiment of the inventive device, in which the connecting means have two or more projections which project at right angles to the axis of rotation of the connecting means, and which can interact with projection operating means disposed along the track. Advantageously, the length of at least one of the projections is different from the length of the other projections. This provides the possibility of making all carriers take up the same initial position prior to a processing operation.

In a further preferred embodiment, the inventive device comprises recording means disposed along the track upstream of corresponding projection operating means for recording one or more parameters concerning each slaughtered animal or part thereof being conveyed past the recording means, and means for controlling the projection operating means on the basis of the data recorded with the recording means, in such a way that the projection operating means do or do not interact with the projections of the connecting means.

In a still further advantageous embodiment the leg carrier comprises means for accommodating the legs of the slaughtered animal, and fixing means which, interacting with the accommodating means, are adapted to enclose each leg like a ring. Preferably, the accommodating means are formed by an essentially elongated, plate-shaped element. This has the advantage that the accommodating means can be used in a production line such as that described in European Patent Specification No. 159,731 in the name of applicants. The carriers of the device are in this case guided along the guides 6 mentioned in the patent specification, so that a very stable suspension of the animal is ensured during conveyance.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 3 shows three carriers of the conveyor disposed one after the other, in different positions along the track;

FIG. 6 shows schematically in top view a processing station for cutting wings of poultry, which is adapted for cooperation with the device for conveying slaughtered poultry.

DESCRIPTION OF THE PREFERRED EMBODIMENTS

Figure 1:
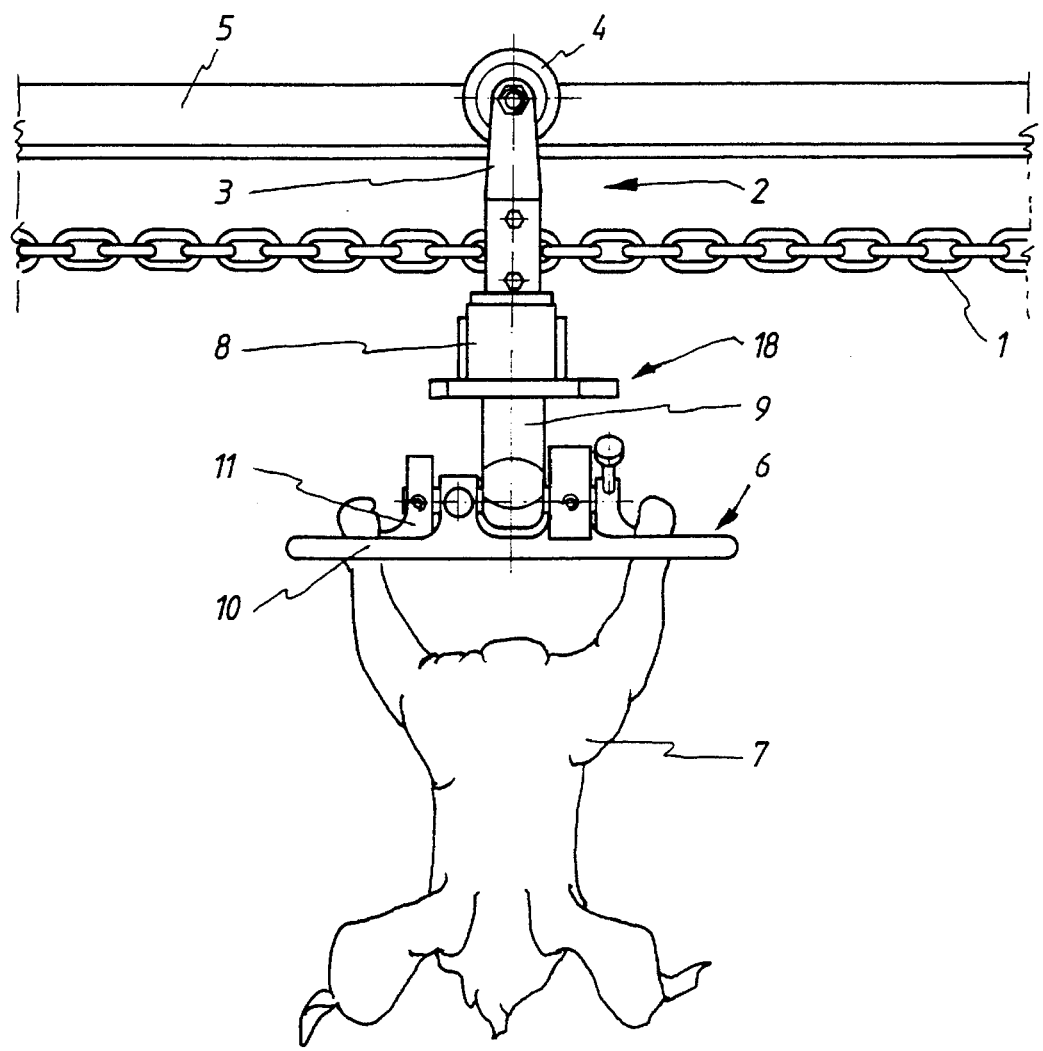
FIG. 1 shows a short section of a conveyor for slaughtered poultry.

The conveyor shown in FIG. 1 is formed by a driven chain conveyor 1, provided with trolleys 2 which in a usual manner comprise a fork-shaped element 3 with wheels 4. The wheels 4 are guided along a rail 5, the shape of which determines the track of the conveyor. This track runs in the usual way through one or more processing or inspection stations (not shown). Each trolley 2 is provided with a leg carrier 6, which is suitable for accommodating the leg of a slaughtered animal, here a slaughtered bird 7, or a part thereof, and carrying it along the track of the conveyor. Each carrier 6 is fixed by way of adjustable connecting means 8 to the corresponding trolley 2. These connecting means 6 make it possible for each carrier 6 during operation to be rotatable through a predetermined angle on a vertical axis.

Figure 2A:
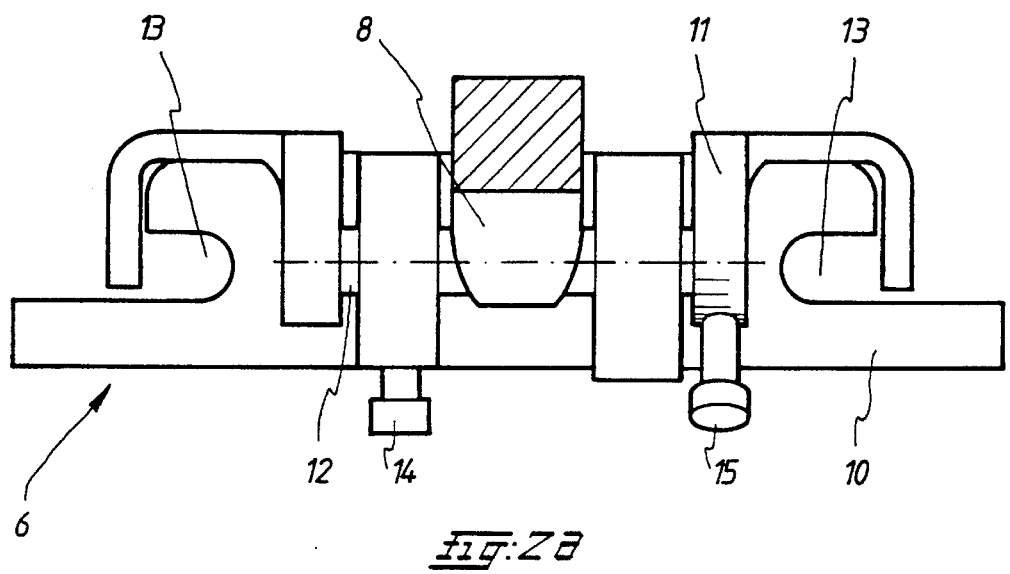
FIGS. 2A and 2B show top views, partially in cross-section of a closed and open leg carrier respectively of the conveyor of FIG. 1.
Figure 2B:
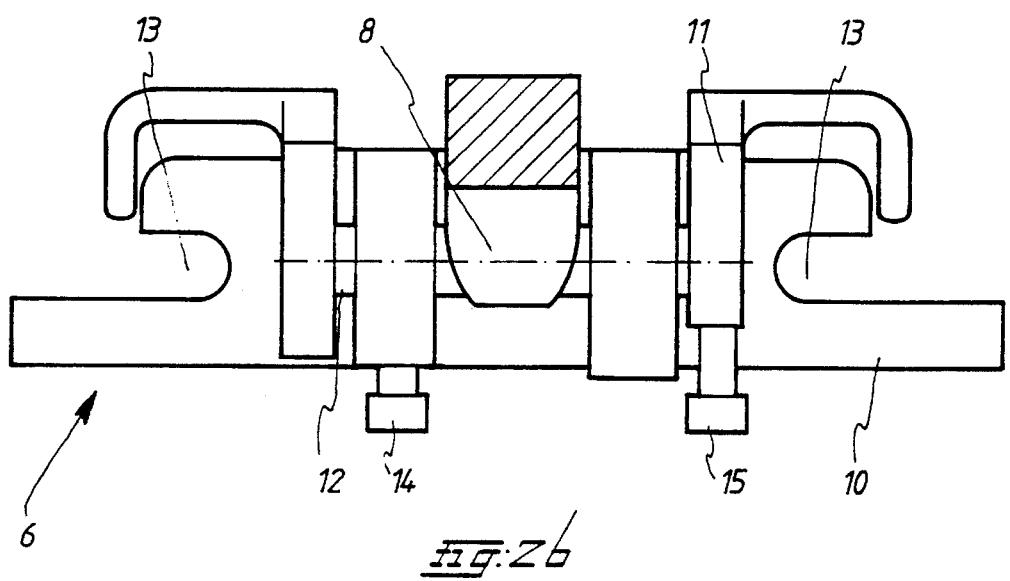

It can be seen in FIGS. 2a and 2b that a carrier 6 is made up of a bearing element 10 and a shut-off device 11, which can pivot relative to each other and relative to the connecting means 8 about an axis 12. The bearing element 10 is provided with two recesses 13, in which the legs of the bird 7 can be accommodated. These recesses 13 have such dimensions that the bird 7 can hang by its tarsal joints. A virtually closed ring, in which the tarsal joint is securely confined, is produced by closing shut-off device 11. The carrier 6 also has two carrier control levers 14, 15, which can produce the rotation of the bearing element 10 and the shut-off device 11 about the axis 12.

FIG. 3 shows how the two carrier control levers 14, 15 interact with guides 16 fitted on a wall (not shown) lying above the plane of the drawing, which interaction will be described below. In order to guarantee good stability in the directions at right angles to the direction of conveyance, the connecting means 8 are guided during operation of the levers 14, 15 between two parallel walls 17 running parallel to the conveyor chain 1, only one of which is shown in the figure.

The lefthand device of the three devices illustrated here shows a carrier 6, in the closed position, in which carrier a bird 7 is hanging by the legs. This situation is identical to that shown in FIG. 1. When the chain conveyor 1 moves to the right in the drawing, the carrier control lever 15 at a given moment comes into contact with guide 16, and said lever will be forced downwards as a result of this intersection, thus opening the shut-off device 11. The carrier assembly will assume the position shown in the centre of FIG. 3 when the slope of the guide 16 ends.

In the carrier on the right in the figure it can be seen how the shut-off device 11 closes again when the carrier control lever 15 goes against a rising guide (groove) 16 on moving further to the right. As a result of this the shut-off device 11 closes again.

The discharging (not shown) of the bird 7 can take place by forcing the carrier control lever 14 upwards when the shut-off device 11 is open, causing the recesses 13 to be directed with their openings downwards, as a result of which the bird 7 can be discharged from them.

Figure 4:
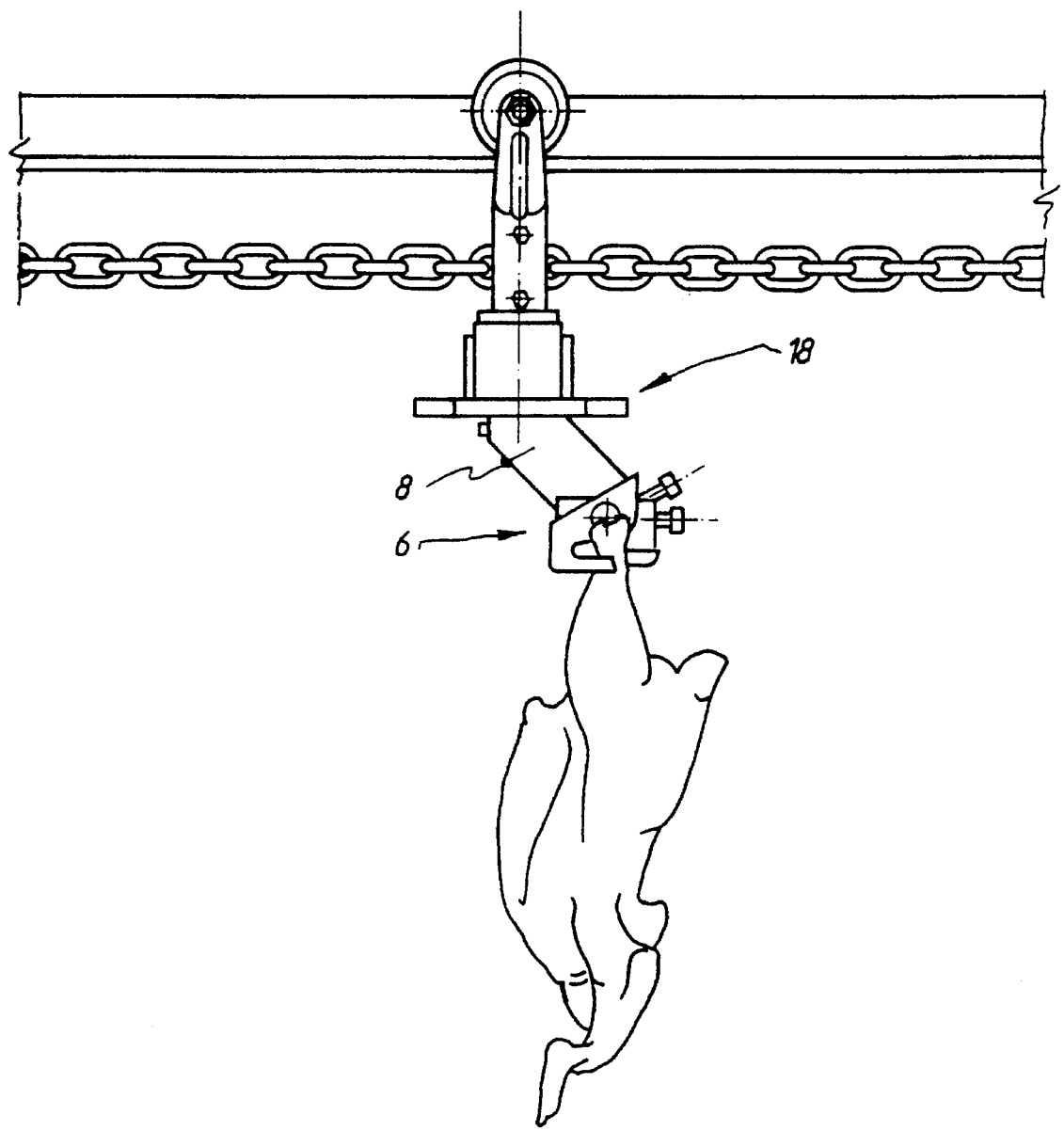
FIG. 4 shows a device from FIG. 1 turned through 90°.

FIG. 4 shows a carrier 6 which is turned through 90° relative to the carrier from FIG. 1. The figure shows clearly that the carrier 6 is disposed eccentrically relative to the trolley, which makes it possible to bypass or actually seek the working range of certain processing machines disposed along the route.

In order to be able to rotate the carrier 6 about a vertical axis, the connecting means 8 are provided with a Maltese cross 18 (FIG. 5) which interacts with arm operating elements 19 fitted at the bottom of the wall 17, and in the case of which the wall 17 acts as a guide for the connecting means. The rotation of the carrier 6 is determined by the interaction between a segment of the Maltese cross, and also by the angular orientation fixing means present (not shown) in the connecting means 8.

Figure 5:
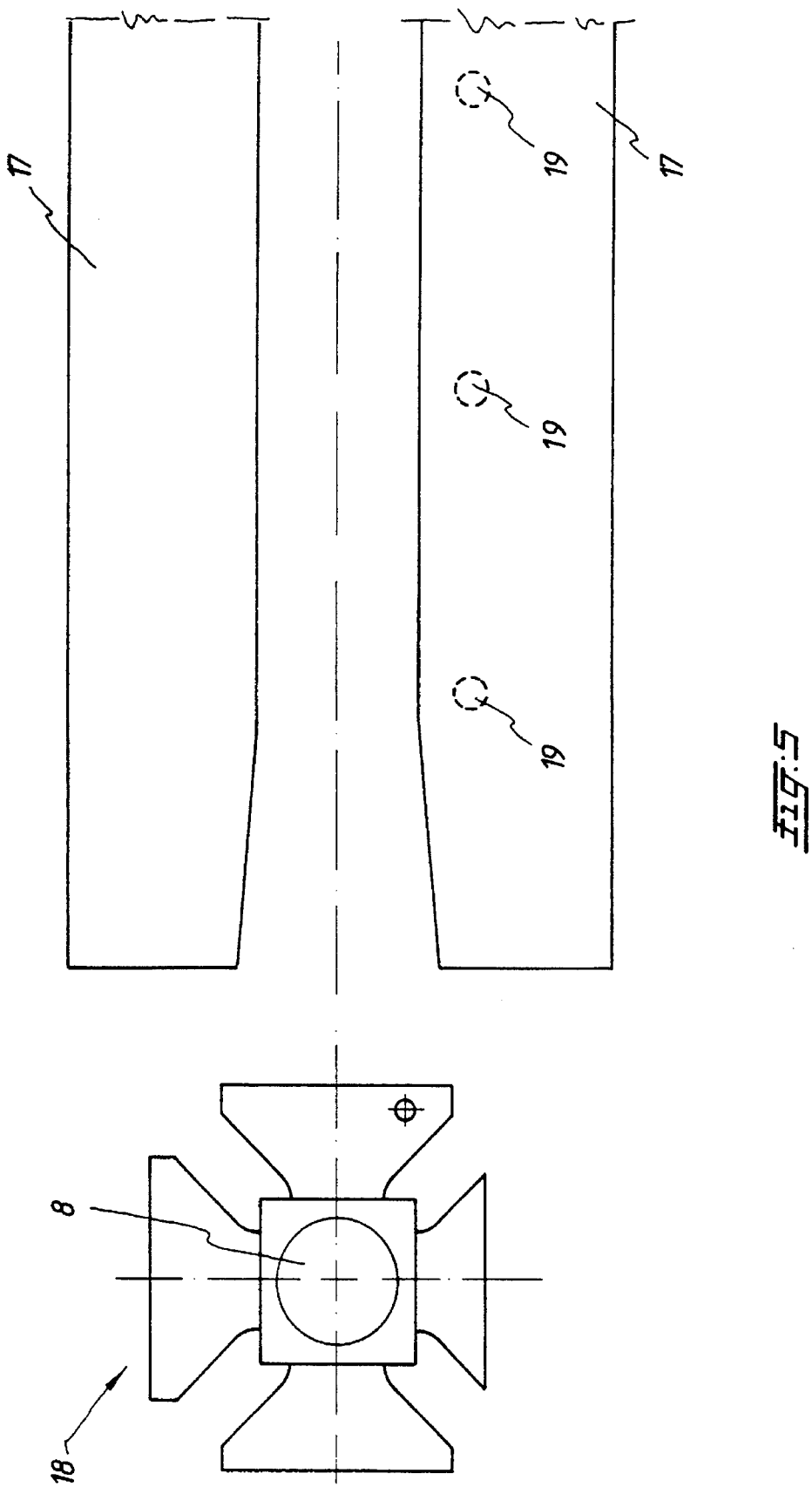
FIG. 5 shows schematically in top view the interaction between a Maltese cross in the connecting means and projection operating elements disposed along the track.

FIG. 5 shows that the segment with the smallest radial dimensions passes the three arm operating elements 19 undisturbed. It will be clear that no matter what the initial position of the Maltese cross 18 is, after the three arm operating elements 19 have been passed, the cross always takes up the same position, which is advantageous for then making a processing selection.

When a selection of a processing operation on the animal is being made, after said animal has been checked for certain characteristics by a recording station, it is possible with the aid or the result of the check to operate the arm operating elements 19, so that an angular orientation to be achieved by the carrier 6 can be selected. In the same way it is possible to have a processing station bypassed by the carrier 6, through the fact that as a result of its eccentric position outside the working range of the processing station in question the carrier passes said station.

FIG. 6 shows schematically in top view a processing station 101 for cutting wings of slaughtered poultry. Slaughtered poultry 105 is carried by a device according to the invention (not shown) along a transport track 100 of a conveyor (not shown). By means of an eccentrical set up of the carrier relative to the trolley, the poultry can be transported forwardly both in position A and in position B.

The processing station consists basically of a frame 102, rotary driven cutting devices 103 for cutting the wings of poultry and wing guide bars 104 for guiding the wings of poultry so that they may take a proper position when being cut.

Also, the frame 102 carries a guide bar 106. The guide bar 106 will act on the poultry which is forwarded in position B by guiding it sideways outside the working range of the processing station 101. After detouring the processing station the poultry will be guided back into its original position close to the transport track 100.

On the other hand, poultry in position A will not be bothered by guide bar 106 and may proceed into the working range of the station 101. The guide bar 106 is provided at its foremost end with a small rotatable wheel 107 for facilitating the guidance of poultry in position A and poultry in position B.

While the invention has been described and illustrated in its preferred embodiments, it should be understood that departures may be made therefrom within the scope of the invention, which is not limited to the details disclosed herein.

What is claimed is:

1. A device for use with a conveyor having a plurality of trolleys for conveying slaughtered animals, in particular birds, or a part thereof, hanging by at least one leg, the conveyor conveying the trolleys past at least one processing station having an operating range, the device comprising means for selectively moving the animal or the part thereof into and out of the operating range of the processing station, including a plurality of leg carriers for hanging the animal or part thereof by at least one leg from each said carrier, which leg carriers are each connected by way of rotatable connecting means to a trolley of the conveyor, the connecting means being rotatable about an essentially vertical axis of rotation through a predetermined angle relative to the trolley, the connecting means comprising means for fixing the angular orientation of the leg carrier relative to the trolley, and comprising at least two projections which project at right angles to the axis of rotation of the connecting means, and which can interact with projection operating means disposed along the track, wherein said leg carriers are disposed eccentrically relative to said axis of rotation of said connecting means, further comprising recording means disposed along the track upstream of corresponding projection operating means for recording one or more parameters concerning each slaughtered animal or part thereof being conveyed past the recording means, and means for controlling the projection operating means on the basis of the data recorded with the recording means, in such a way that the projection operating means do or do not interact with the projections of the connecting means.

2. A device according to claim 1, in which the connecting means have two or more projections which project at right angles to the axis of rotation of the connecting means, and which can interact with projection operating means disposed along the track.

3. A device according to claim 2, wherein the length of at least one of the projections is different from the length of the other projections.

4. A device according to claim 2, wherein the connecting means comprise a Maltese cross with a number of segments which are separated from each other by grooves.

5. A device according to claim 4, wherein one segment has smaller radial dimensions than the remaining segments.

6. A device according to claim 1, wherein the leg carrier comprises means for accommodating the legs of the slaughtered animal, and fixing means which, interacting with the accommodating means, are adapted to enclose each leg like a ring.

7. A device according to claim 6, wherein the accommodating means are formed by an essentially elongated, plate-shaped element.

8. A device according to claim 6, wherein the fixing means are movable relative to the accommodating means.

9. A device according to claim 6, wherein the fixing means are adapted to interact with control means disposed along the track to retain the log in, or release the leg from the leg carrier.

10. A device for use with a conveyor having a plurality of trolleys for conveying slaughtered animals, in particular birds, or a part thereof, hanging by at least one leg, the conveyor conveying the trolleys past at least one processing station having an operating range, the device comprising means for selectively moving the animal or the part thereof into and out of the operating range of the processing station, including a plurality of leg carriers for hanging the animal or part thereof by at least one leg from each said carrier, which leg carriers are each connected by way of rotatable connecting means to a trolley of the conveyor, the connecting means being rotatable about an essentially vertical axis of rotation through a predetermined angle relative to the trolley, wherein said leg carriers are disposed eccentrically relative to said axis rotation of said connecting means, further comprising guide elements diverging from the conveyance track in the direction of conveyance for guiding the animals off the conveyance track.

11. A method for processing slaughtered animals or parts thereof, such as poultry or parts thereof, in which a conveyor selectively moves the animals or parts thereof along at least two processing paths of conveyance, the first path being past at least one processing station and the second path being a bypass path to bypass the at least one processing station, the method comprising the steps of:

(a) suspending the animal or part thereof by its legs from the conveyor in a rotatable carrier which can be rotated about an axis, the animal or part thereof being positioned eccentrically relative to the axis for rotation between at least a first position for conveying the animal or part thereof along the processing path for processing the animal or part thereof in the processing station, and a second position for conveying the animal or part thereof along the bypass path spaced apart from the processing path for bypassing the processing station; and (b) selectively moving the rotatable carrier between the first and second positions to selectively convey the animal or part thereof along the processing path to engage the processing station or along the bypass path to bypass the processing station.

12. A method as claimed in claim 11 further comprising the steps of recording one or more parameters about each slaughtered animal or part thereof and controlling the movement of the rotatable carrier to selectively convey the animal or part thereof along the processing path to engage the processing station or along the bypass path to bypass the processing station in response to the recorded parameters.

13. A method as claimed in claim 11 wherein the step of selectively conveying the animal or part thereof along the bypass path to bypass the processing station comprises guiding the animal or part thereof with a guide element.

14. A method as claimed in claim 11 wherein the step of selectively moving the rotatable carrier between the first and second positions comprises rotating the rotatable carrier through a predetermined angle.

15. A method as claimed in claim 11 wherein the step of selectively moving the rotatable carrier between the first and second positions comprises rotating the rotatable carrier through a predetermined angle of at least about one-quarter turn.

* * * * *

UNITED STATES PATENT AND TRADEMARK OFFICE
CERTIFICATE OF CORRECTION

PATENT NO. : 5,505,657
DATED : April 9, 1996
INVENTOR(S) : Petrus C.H. Janssen, Cornelis J. Janssen,
Eric H.W. Peters and Adrianus J. van den Nieuwelaar It is certified that error appears in the above-indentified patent and that said Letters Patent is hereby corrected as shown below:

Column 2, line 58, after the word "means", delete "6" and insert - - 8 - -

Signed and Sealed this

Fifth Day of August, 1997

*Attest:*

*Attesting Officer*

BRUCE LEHMAN

*Commissioner of Patents and Trademarks*